United States Patent

Clarke et al.

4,073,574
Feb. 14, 1978

[54] OPTICAL PROJECTOR

[75] Inventors: John Alfred Clarke, Wallington; Harry Howden, Smallfield, both of England

[73] Assignee: U.S. Philips Corporation, New York, N.Y.

[21] Appl. No.: 728,508

[22] Filed: Oct. 1, 1976

Related U.S. Application Data

[63] Continuation of Ser. No. 525,664, Nov. 20, 1974, abandoned.

[30] Foreign Application Priority Data

Nov. 28, 1973 United Kingdom ............... 55177/73

[51] Int. Cl.² .......................... G02B 3/04; G02B 17/08
[52] U.S. Cl. ...................................... 350/189; 350/200
[58] Field of Search ................................ 350/189, 200

[56] References Cited

U.S. PATENT DOCUMENTS 2,298,808  10/1942  Ramberg ............................. 350/200

OTHER PUBLICATIONS

A. K. Rigler, et al., "Spline Functions . . . ", *Applied Optics*, vol. 10, No. 7, July 1971, pp. 1648–1651.

*Primary Examiner*—Paul A. Sacher
*Attorney, Agent, or Firm*—Frank R. Trifari; Simon L. Cohen

[57] ABSTRACT

An aspheric element, placed near a principle plane of an wide-angle, wide-aperture image forming system and having in its aspheric function a term proportional to the third power of the distance from the optic axis improves off-axis revolution.

7 Claims, 3 Drawing Figures

OPTICAL PROJECTOR

This is a continuation of application Ser. No. 525,664, filed Nov. 20, 1974, now abandoned.

This invention relates to wide angle, wide aperture optical systems in which the resolution on axis has been deliberately degraded in the interest of improving resolution off axis. An object of such a system might be to achieve a resolution across the whole field of view which is subjectively constant. Such an optical system may be used as the objective of a projection system for example a television picture projector.

The use of axially symmetric aspheric elements is known to provide an additional degree of freedom in the design of optical systems generally. This design freedom may be used, amongst other things, for improvement of off-axis performance.

In this connection, an aspheric surface is a surface in which the axial deviation of a point on the surface from an axially centered spherical or planar reference surface is a function of the distance of the point from the optic axis in a plane perpendicular to the optic axis. This aspheric function is defined herein as the sum of one or more terms, each of which is proportional to a power of the said distance from the optic axis.

In the past, however, the forms of asphericity which have been used have been mostly confined, for well known optical reasons, to forms in which the aspheric function is composed of terms of even power. However other forms of asphericity may, under certain circumstances, provide useful improvements in optical system performance.

Accordingly, the invention provides an optical system comprising an image forming system and an aspheric element placed at or near a principal plane of the image forming system, the aspheric element having an aspheric function as herein defined wherein a third power term is included.

Any one or more other odd power terms may be included additionally, such as the first, fifth or higher powers. The terms of the aspheric function may also be restricted to the third and fifth terms.

The image forming system may comprise a plurality of optical elements, the elements individually being reflective, refractive or possibly a combination of reflective and refractive as in the case of the known Mangin "thick" mirror. The aspheric element may be refractive in operation any may comprise an aspheric surface on an otherwise flat transparent plate on an otherwise spherical transparent meniscus. The aspheric surface may be incorporated as additional figuring on another aspheric surface or on an otherwise spherical surface of a refractive element having optical power. Alternatively the aspheric element may be reflective in operation and may comprise an aspheric surface on an otherwise flat mirror or on an otherwise spherical mirror.

The aspheric element is necessarily symmetric about the optic axis of the optical system. The optical system may comprise other aspheric elements incorporated for other design reasons. For example, if a Schmidt reflecting objective system is being used as the optical system, an aspheric plate will be present at or near the center of curvature of the main spherical mirror. It may be convenient, in this case, to incorporate the aspheric element of the present invention as additional figuring on the now classical aspheric surface of the Schmidt plate.

The usefulness of such terms for improving off-axis resolution can be appreciated by considering the off-axis aberrations of optical systems generally. A general treatment of such aberrations in terms of the corresponding aberrations of the spherical wavefront which, ideally, should be produced by an optical system for on and off axis points has been given by H. H. Hopkins in his book "Wave Theory of Aberrations" Oxford University Press 1950. This treatment is useful in the present context as it provides the form of aberration compensating surfaces directly. Hopkins has derived the wavefront aberrations which may occur in a symmetrical optical system and has tabulated them on page 52 of his book. He relates these aberrations to the corresponding Seidel or ray aberrations. Assuming spherical aberration to have been separately controlled, the first aberration to appear as the image point goes off-axis is coma. Hopkins shows in equation 84 on page 55 of his book that the corresponding wavefront aberration is given by:

$$W = \sigma({}_1C_{31} r^3 + {}_1C_{51} r^5 + \ldots) \cos \phi \qquad (1)$$

where:
$W$ is the aberration or separation between the wavefront and a true sphere at a point R on the wavefront;
$\sigma$ is the fraction of the maximum field of a point O in the image;
$r$ is the fraction of the maximum aperture of the optical system of the point R;
$\phi$ is the polar angle of R from the meridian plane; and
$1°31$ and $1°51$ are co-efficients.

Thus the aberration at one off-axis point in the image could be completely corrected by employing a corrector plate figured to counter the aberrations given by equation (1).

But such a figured corrector would necessarily be asymmetric about the optic axis owing to the $\cos \phi$ term and would further degrade the image at points on the opposite side of the optic axis. However, a symmetrical corrector plate figured for best correction for an intermediate value of the field, $\sigma$, and for an average modulus of $\cos \phi$, leads to partial correction over most parts of the field even though the axial image is somewhat degraded. The energy distribution in the comatic image of a point object now consists of two noticeably different components. On one half of the aperture, where the sign of $\cos \phi$ is correct, the corrector improves the concentration of energy. On the other half of the aperture, where the sign of $\cos \phi$ is reversed, the correction is negative and energy is spread over a wider area, contributing more to flare than to degradation of the point image. Thus a higher resolution image is seen against a background of increased flare. Subjectively however, this is found to be preferable to absolute loss of resolution without the increased flare.

In many practical optical objectives, it is common practice to place a limiting aperture somewhere in the objective so that off-axis aberrations are controlled by vignetting. This amounts to removing those parts of the wavefront forming an off-axis point image which have the severest effect on image degradation. The loss of off-axis brightness is often acceptable, especially in instruments for visual use since the eye can tolerate a gradual loss of brightness towards the edge of the field. This off-axis vignetting may be used to advantage with this invention to remove those portions of the wavefront which contribute to flare. These portions, due to that half of the aperture where the correction is negative, can be seen from equation (1) to have their greatest effect at the edge of the aperture owing to the power law terms. If the vignetting increases asymmetrically as the object point goes off-axis, starting at the edge of the negative correction half of the aperture, the loss of brightness off-axis will be largely due to loss of flare; the brightness of the image due to the corrected half of the aperture being less affected.

An embodiment of the invention will now be described, by way of example, with reference to the accompanying diagrammatic drawings in which.

Figure 1:
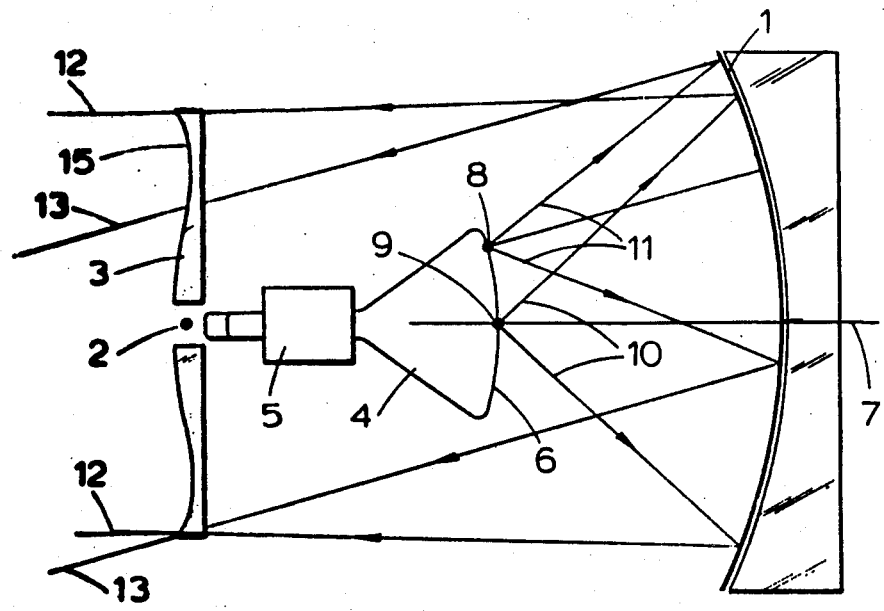
FIG. 1 shows the optical elements of a Schmidt projection system for a television picture.

Referring to FIG. 1, the spherical mirror 1 has its center of curvature 2 at the pole of the Schmidt plate 3, figured in the now classical form to correct the spherical aberration of mirror 1 with a profile 15. The cathode ray tube 4 with scan coils 5 has a face plate 6 of spherical form with its center of curvature near the center 2 and a radius of curvature nominally half that of mirror 1. The rays shown in FIG. 1 are confined to the meridian plane i.e. that plane containing the optic axis 7 and an off-axis object point 8. A cone of rays 10 is shown diverging from the axial object point 9 to fill the Schmidt plate 3. The cone 10 does not use all of mirror 1 which is made somewhat larger in diameter than Schmidt plate 3 to cope with the cones of rays from a certain range of off-axis object points without loss of aperture. Object point 8 is so far off axis that the outer part of the upper half of the cone of rays 11 is lost. The outgoing beams 12 and 13 are shown as paralleled for simplicity as though the image were projected at an infinite distance. In practice, face plate 6 would be moved away from mirror 1 slightly to produce convergent beams focusing at a finite distance. This finite image distance has a small effect on the shape of Schmidt plate 3 required to correct the spherical aberration.

Figure 2:
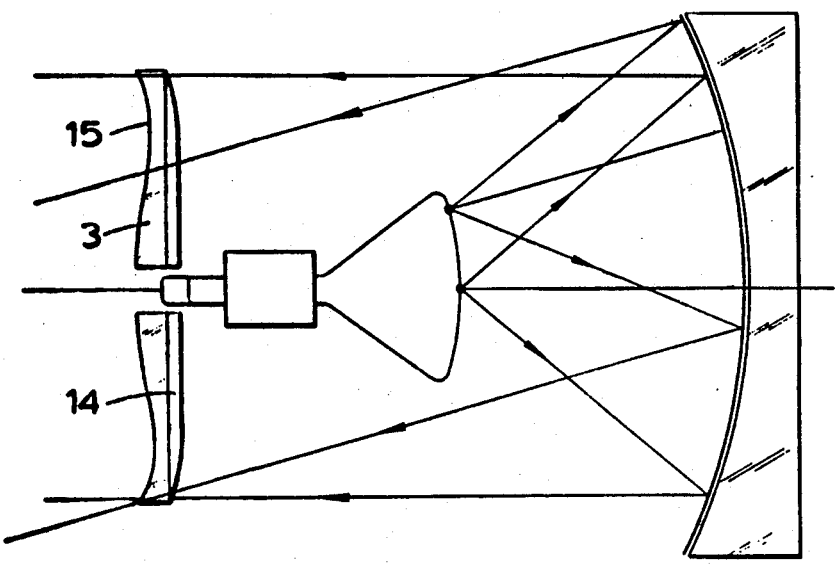
FIG. 2 shows the projection system of FIG. 1 with the aspheric element added.

FIG. 2 shows the aspheric element according to the invention applied to the projection system of FIG. 1 as an additional figured element 14 added on the plane side of plate 3 for simplicity. In practice, the additional figuring may be incorporated into the profile 15 of plate 3.

Figure 3:
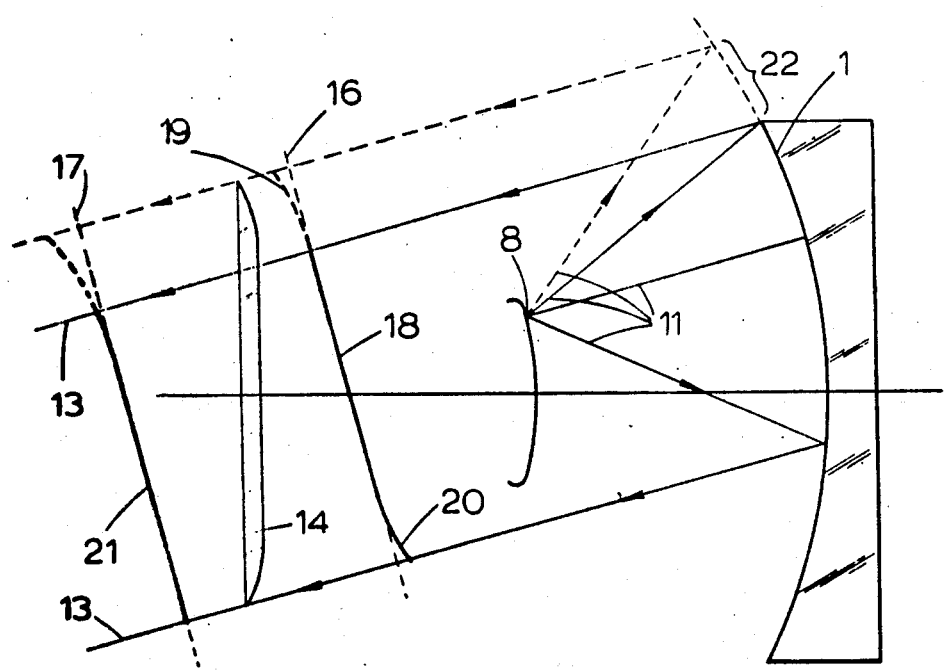
FIG. 3 shows the projection system of FIG. 2 in skeleton form with the wavefront correction obtained.

FIG. 3 shows the projection system of FIG. 2 in skeleton form and with the Schmidt plate 3 not shown. The wavefronts shown are assumed to have been operated upon by the Schmidt plate to remove spherical aberration. Also the beam 13 is shown parallel so that a perfect wavefront section would be shown as straight lines 16 and 17 normal to the beam 13. The S-shaped wavefront section 18 has the shape characteristic of a coma. In this case, the coma is positive, the upper half 19 of the wavefront 18 curling forward in advance of the ideal plane 16 and the lower half 20 of the wavefront 18 curling back in retard of the ideal plane 16. The symmetrical element 14 can only be figured to correct one half of wavefront 18, as will now be obvious. The figuring is therefore chosen to correct the lower half 20 of the wavefront 18 by thinning the element 14 towards its edge in accordance with the odd power terms in $r$ of equation (1). The retardation of wavefront 18 by element 14 is least towards the lower half 20 straightening this part of the wavefront to produce the corrected wavefront 21.

But in the upper half 19 of wavefront 18, the forward curling is increased contributing to flare surrounding the improved image produced by the lower half 20 of wavefront 18. The beneficial effect of the vignetting action of the mirror 1 can now be seen. The off-axis object point 8 is so far off-axis that the upper portion 22 of the cone of rays 11 is lost owing to the limited size of mirror 1. This portion 22 would have provided the wavefront portion 19 which would have been further aberrated by element 14. Thus, the vignetting action disposes of the most severely aberrated part of the wavefront, leaving only the better corrected parts of the wavefront to contribute to the image. It should be noted from equation (1) that these comatic aberrations are proportional to $\sigma$, the fractional field angle. But the vignetting action also increases with field angle, hence contributing to maintaining resolution constant across the field.

An example will now be given of a typical design of an aspheric element for use with the Schmidt projection system defined below.

This Schmidt projection system produces positive coma. In the example below the correction terms are negative (less thickness) and so will correct the lower part of the wavefront as shown in the FIG. 3. All dimensions are given in arbitrary units.

TABLE I

Mirror radius = 1
Semi-aperture of Schmidt plate = 0.35
Image distance from Schmidt plate = 12
Picture diagonal = 7.5
The Schmidt plate profile has an axial displacement Z given by:

$$Z = -0.20 \times 10^{-2} r^2 + 7.14 \times 10^{-3} r^4 + 1.13 \times 10^{-3} r^6 + 4.9 \times 10^{-4} r^8 \qquad (2)$$

where $r$ is the fractional distance from the optic axis in the plane of the aperture.

The aspheric element profile for a picture whose diagonal is 7.5 is given by:

$$Z = -1.0 \times 10^{-4} r^3 - 3.7 \times 10^{-4} r^5 \qquad (3)$$

What we claim is:

1. An optical system comprising an image forming system and a symmetrical aspheric element placed proximate a principal plane of the image forming system, the thickness of the aspheric element having an aspheric polynomial function including a term proportional to the third power of the distance from the optic axis.

2. An optical system as claimed in claim 1 wherein a further term is included in the aspheric function of the aspheric element, which is proportional to another odd power of the said distance.

3. An optical system as claimed in claim 1 wherein a single term proportional to the fifth power of the said distance is included in the aspheric function of the aspheric element.

4. An optical system as claimed in claim 3 wherein the terms defining the aspheric function of the aspheric element are limited only to a term proportional to the third power and a term proportional to the fifth power of the said distance.

5. An optical system as claimed in claim 1 wherein the image forming system comprises a spherical reflecting mirror for forming said image and a refractive element opposite said mirror for correcting spherical aberrations of said mirror.

6. An optical system as claimed in claim 5 wherein the refractive correcting element is a Schmidt plate.

7. An optical system as claimed in claim 6 wherein a limiting aperture is placed at the mirror and is adapted to provide off-axis vignetting.

* * * * *

UNITED STATES PATENT AND TRADEMARK OFFICE
CERTIFICATE OF CORRECTION

PATENT NO. : 4,073,574
DATED : Feb. 14, 1978
INVENTOR(S) : JOHN ALFRED CLARKE & HARRY HOWDEN

It is certified that error appears in the above—identified patent and that said Letters Patent are hereby corrected as shown below:

Column 2, line 31, "$1^o$ 31 and $1^o$ 51" should be

--$1^c$ 31 and $1^c$ 51--

Column 4, line 36, "Z= -0.20" should be --Z= -1.20--

Signed and Sealed this

First Day of August 1978

[SEAL]

Attest:

RUTH C. MASON
*Attesting Officer*

DONALD W. BANNER
*Commissioner of Patents and Trademarks*